June 2, 1970     L. C. MONTGOMERY     3,515,574
METHOD FOR METALLIZING A BORON NITRIDE CONTAINING BODY
Filed Dec. 5, 1967

INVENTOR
LIONEL C. MONTGOMERY
BY
ATTORNEY

United States Patent Office 3,515,574
Patented June 2, 1970

3,515,574
METHOD FOR METALLIZING A BORON
NITRIDE CONTAINING BODY
Lionel C. Montgomery, North Olmsted, Ohio, assignor to Union Carbide Corporation, a corporation of New York
Filed Dec. 5, 1967, Ser. No. 688,074
Int. Cl. B32b 15/04, 31/26
U.S. Cl. 117—71                                16 Claims

ABSTRACT OF THE DISCLOSURE

A method is provided for metallizing a boron nitride containing body which comprises coating a surface of the boron nitride containing body with a titanium-silicon alloy and heating the so-coated body at a temperature sufficient to cause a portion of the titanium-silicon alloy to diffuse into said boron nitride containing body and react with the contacted boron nitride therein while leaving at least a molecular layer of undiffused titanium-silicon alloy on the surface of the boron nitride containing body. The resultant metallized boron nitride containing body can be readily joined to metal articles by conventional metal bonding techniques.

FIELD OF THE INVENTION

The present invention relates to a method of metallizing a boron nitride containing body. In particular, it concerns a method of forming a metallized layer on the surface of a boron nitride containing body which layer, in turn, can be readily bonded to a metal article by conventional metal bonding techniques.

DESCRIPTION OF THE PRIOR ART

Boron nitride containing bodies or composites find usage in the chemical, electronic and metallurgical industries. However, such usage is often limited due to the fact that they are not easily bonded to metallic articles.

For example, in the vapor plating of certain articles it is common practice to vaporize the desired metal from an electrically conductive container or crucible which is fashioned from a boron nitride containing refractory composite material. From a coating standpoint this type of apparatus is highly successful but trouble is often experienced in trying to maintain an efficient electrical contact between the metal containing crucible and the power source. In the main, this is due to the fact that metals cannot be bonded directly to a boron nitride containing crucible of this type. The usual practice in the art is to connect the crucible to the metallic electrical lead-in rods by means of clamps or similar devices. However, during the vapor plating procedure this type of connection tends to lose its effectiveness due to the differential coefficient of thermal expansion between the ceramic crucible and the metallic lead-in rods. Accordingly, the resultant inefficient electrical connection adversely affects the economics of the vapor plating process.

In addition, due to its inherent thermal stabiltiy and excellent dielectric properties boron nitride bodies are often used by the electronics industry in heat sink assemblies. However, again, their use is somewhat limited due to the fact that it is difficult to join boron nitride to a metallic article so as to provide an efficient conductive path along which thermal energy can be transferred.

The present invention overcomes the foregoing problems by providing a novel means for metallizing a boron nitride containing body which can then be readily joined to a metal article by such techniques as brazing and welding.

SUMMARY

Briefly, the instant invention is accomplished by a proces which comprises coating a surface of a shaped boron nitride containing refractory body with a titanium-silicon alloy and then heating the so-coated body at a temperature sufficient to cause at least some of the titanium-silicon alloy to diffuse into the boron nitride containing body and react with the contacted boron nitride therein while leaving at least a molecular layer of undiffused titanium-silicon alloy on the surface of the boron nitride containing body.

Boron nitride containing bodies coated by the foregoing technique can then be readily joined to metal articles by conventional metal bonding techniques.

Accordingly, it is the principle object of the invention to provide a means whereby boron nitride containing bodies can be metallized and then readily joined to metal articles by conventional metal bonding techniques.

DESCRIPTION OF THE DRAWINGS

Referring now to the drawings in detail, FIG. 1 is a fragmentary view, in cross-section, of a boron nitride containing body 14 having a reaction zone 12 consisting of the product formed by reacting a titanium-silicon alloy with boron nitride and a surface layer 10 of undiffused titanium-silicon alloy thereon.

FIG. 2 is a fragmentary view, in cross-section, of a joint formed between a boron nitride body 16 and a molybdenum metal bar 24. The boron nitride body 16 and metal bar 24 are held together by a sintered titanium-silicon alloy 20 which adheres on one side to a first reaction zone 18 formed by reacting a titanium-silicon alloy with boron nitride and on the opposite side to a second reaction zone 22 formed by reacting a titanium-silicon alloy with molybdenum.

FIG. 3 is a fragmentary view, in cross-section of a joint characterized by its high thermal conductivity formed betwen a boron nitride body 26 and a nickel rod 38. This joint comprises a boron nitride body 26 having a reaction zone 28 formed by reacting boron nitride with a titanium-silicon alloy, a sintered zone of titanium-silicon alloy 30 bonded to the foregoing reaction zone, a tungsten member 34 bonded to the sintered titanium-silicon alloy through a second reaction zone 32 caused by reacting that portion of the tungsten member with a titanium-silicon alloy and, in turn, a nickel rod 38 bonded to the tunsgten member 34 by means of a conventional braze 36.

DESCRIPTION OF THE PREFERRED EMBODIMENTS OF THE INVENTION

Figure 1:
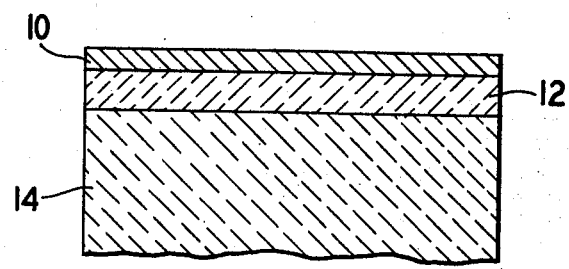
FIG. 1 is a diagrammatical illustration, in cross-section, of a boron nitride containing body having a metallized surface thereon formed by the technique of the invention.
Figure 2:
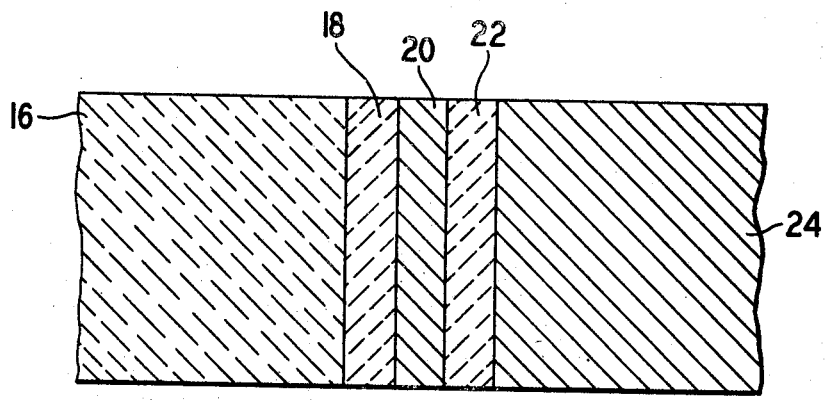
FIG. 2 is a diagrammatical illustration, in cross-section, showing a boron nitride-to-metal joint formed by the technique of the invention.
Figure 3:
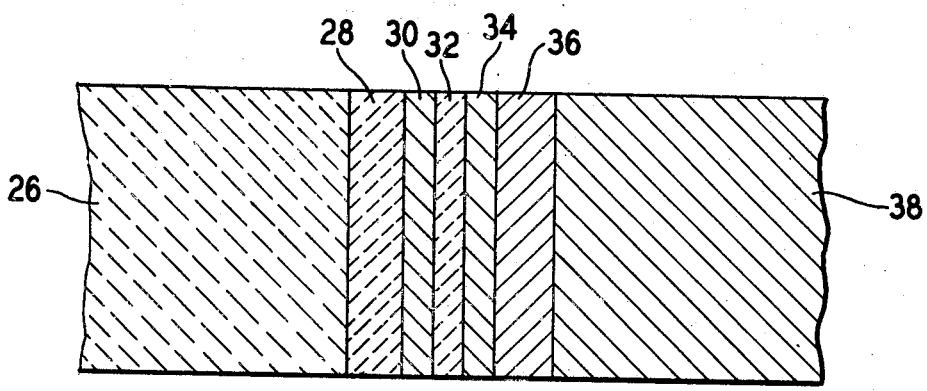
FIG. 3 is a daigrammatical illustration, in cross-section, showing a thermaly conductive boron nitride-to-metal joint formed by the technique of the invention.

The body to be coated with a surface layer of titanium-silicon alloy should contain a substantial amount of boron nitride. In practice, best results are obtained by employing a body containing all boron nitride or one containing from about 20 to about 80 weight percent boron nitride with the remainder being titanium diboride. It should be noted that refractory materials other than titanium diboride may be employed in the practice of the instant invention. For example, the boron nitride containing body may also contain other refractory materials such as zirconium diboride, aluminum nitride, pyrolytic graphite and the like. The foregoing list of materials is illustrative only and is not intended to unduly limit the scope of the instant invention.

The boron nitride containing body is usually metallized by coating it either with a molten titanium-silicon alloy, as by flame spraying, or a slurry of titanium-silicon particles and then heating the so-coated body to a temperature sufficient to cause some of the alloy to diffuse into the boron nitride containing body and react with the contacted boron nitride while leaving at least a molecular layer of titanium-silicon alloy on the surface of the body. When the slurry technique is employed, the coating of titanium-silicon particles should not be heated above the melting point of the alloy, the preferred temperature range being from about 1400° C. to about 1500° C. depending on the exact alloy composition employed. Methods for forming a slurry of titanium-silicon particles are so well known in the art that they will not be discussed herein.

It should be noted here that the main advantage afforded by the beforementioned slurry techniques is that it enables one to more easily coat and then metallize irregularly shaped boron nitride containing bodies. In addition, it should also be noted that best results are obtained when the titanium-silicon alloy employed contains from about 40 to 80 weight percent silicon with the remainder being essentially titanium regardless of the method used to apply it.

If a metallic article is to be joined to a boron nitride containing body, this can be accomplished by first forming a bonded layer of titanium-silicon alloy on the surface of the body and then affixing the metal article thereto by conventional metal bonding techniques. Or, if desired, the forming of the bonded titanium-silicon layer and the affixing thereto of the metal article can be accomplished in the same operation. This method is described in detail of Example I. When joining a metallic article to a boron nitride article at high temperatures, it is essential that the metal article have a coefficient of thermal expansion which is similar to that of the boron nitride containing body. Examples of such metals are tungsten and molybdenum, among others. However, when the boron nitride containing body is already provided with a surface layer of titanium-silicon the coefficient of thermal expansion of the article to be joined thereto need not necessarily match that of the boron nitride containing body.

In practice, the metallic article may be joined to the metallized boron nitride containing body by any one of a variety of techniques. For example, it may be joined by common welding methods or by means of a conventional braze. The exact means to be employed depends on the ultimate temperature which the resulting joint will experience. Low temperature joints have been formed by using, among others, copper and gold base brazes. In addition, good high temperature joints have been formed by using the titanium-silicon alloy itself as the brazing material.

The following examples illustrate in detail the practice of the instant invention.

EXAMPLE I

A slurry of titanium disilicide particles (having an average particle size of 7 microns) was prepared by suspending a powdered 44 weight percent titanium 56 weight percent silicon alloy in a xylene slip which contained 20 volume percent cyclopentadiene as a deflocculant. The so-produced titanium-silicon containing slurry was then applied by painting the defining surfaces of a small cavity (approximately 3/32 inch in diameter by 1/4 inch in depth) fashioned in one end of a refractory evaporation vessel. This vessel consisted of 50 weight percent boron nitride with the remainder being essentially all titanium diboride. A stranded molybdenum wire approximately 1/16 inch in diameter was also coated at one end with the beforedescribed titanium-silicon slurry. The coated end of the wire was then inserted into the hole in the evaporation vessel. The resultant assembly was held together and subsequently heated in an argon atmosphere for about 4 hours to a temperature of about 1450° C. This assembly was then cooled to room temperature and examined metallographically and found to be metallurgically bonded together.

Titanium diboride-boron nitride vessels fitted with stranded molybdenum lead-in wires as beforedescribed have been used successfully to evaporate aluminum by the passage of electrical current therethrough.

EXAMPLE II

One surface of a rectangular boron nitride bar was coated with a slurry of titanium-silicon particles as described in Example I. The surface of a thin sheet of molybdenum was similarly coated with titanium-silicon particles. The so-coated portions of the above articles were brought together in an essentially abutting manner and there held in a jig while the resulting assembly was heated in an argon atmosphere at a temperature of about 1450° C. for about 4 hours and then cooled to room temperature to bond them together. The unmetallized surface of the molybdenum sheet was then joined to a copper bar by conventional brazing methods. The brazing temperature was 1100° C. The braze employed was a conventional copper base braze. The resultant assembly was thermally stable to temperatures of up to about 600° C.

The technique of bonding together two materials having substantially different thermal expansion properties by positioning a plurality of substances therebetween which have intermediate thermal expansion characteristics is well known in the art and while applicable to the instant invention will not be discussed in detail herein.

The foregoing examples are presented for illustrative purposes only and are not intended to unduly limit the reasonable scope of the instant invention. The limitations of the invention are defined by the following claims.

What is claimed is:
1. A process for metallizing a boron nitride containing body comprising:
   (a) coating a surface of said boron nitride containing body with a titanium-silicon alloy, and
   (b) heating the so-coated surface of said boron nitride containing body at a temperature sufficient to cause a portion of said titanium-silicon alloy to diffuse into said boron nitride containing body and react with the contacted boron nitride therein while leaving at least a molecular layer of undiffused titanium-silicon alloy on the surface of said boron nitride containing body.

2. The process of claim 1 wherein the boron nitride containing body is coated with a slurry of titanium-silicon particles.

3. The process of claim 2 wherein step (b) is carried out at a temperature in the range of from about 1400° C. to about 1500° C.

4. The process of claim 2 wherein step (b) is carried out at about 1450° C.

5. The process of claim 2 wherein the slurry of titanium-silicon particles comprises:
   (a) a xylene vehicle;
   (b) a cyclopentadiene deflocculating agent; and
   (c) titanium-silicon particles having an average particle size of about 7 microns.

6. The process of claim 1 wherein the boron nitride containing body consists essentially of from about 20 to about 80 weight percent boron nitride with the remainder being titanium diboride plus adventitious impurities.

7. The process of claim 1 wherein the boron nitride containing body is coated with molten titanium-silicon alloy.

8. The process of claim 1 wherein the titanium-silicon alloy employed in step (a) consists of from about 40 to about 80 weight percent silicon with the remainder being essentially titanium.

9. A method for joining a boron nitride containing body to a metal article comprising:
(a) coating a surface of the boron nitride containing body with a titanium-silicon alloy;
(b) heating the so-coated surface of said boron nitride containing body at a temperature sufficient to cause a portion of said titanium-silicon alloy to diffuse into said boron nitride containing body and react with the contacted boron nitride therein while leaving at least a molecular layer of undiffused titanium-silicon alloy on the surface of said boron nitride containing body; and
(c) bonding a metal article to the boron nitride containing body at the point where the undiffused layer of titanium-silicon alloy is formed on the boron nitride containing body.

10. The process of claim 9 wherein the boron nitride containing body is coated with a slurry of titanium-silicon particles.

11. The process of claim 10 wherein step (b) is carried out at a temperature in the range of from about 1400° C. to about 1500° C.

12. The process of claim 10 wherein step (b) is carried out at about 1450° C.

13. The process of claim 10 wherein the slurry of titanium-silicon particles comprises.

(a) a xylene vehicle;
(b) a cyclopentadiene deflocculating agent; and
(c) titanium-silicon particles having an average particle size of about 7 microns.

14. The process of claim 9 wherein the boron nitride containing body consists essentially of from about 20 to about 80 weight percent boron nitride with the remainder being titanium diboride plus adventitious impurities.

15. The process of claim 9 wherein the boron nitride containing body is coated with molten titanium-silicon alloy.

16. The process of claim 9 wherein the titanium-silicon alloy employed in step (a) consists of from about 40 to about 80 weight percent silicon with the remainder being essentially titanium.

References Cited
UNITED STATES PATENTS

| | | | |
|---|---|---|---|
| 3,216,710 | 11/1965 | Lenihan et al. | 117—221 |
| 3,264,135 | 8/1966 | Wakelyn et al. | 117—71 |
| 3,399,076 | 8/1968 | Ginsberg et al. | 117—221 |

ALFRED L. LEAVITT, Primary Examiner

J. A. BELL, Assistant Examiner

U.S. Cl. X.R.

117—69, 105, 118, 121, 160, 221

Disclaimer 3,515,574.—*Lionel C. Montgomery*, North Olmsted, Ohio. METHOD FOR METALLIZING A BORON NITRIDE CONTAINING BODY. Patent dated June 2, 1970. Disclaimer filed Mar. 5, 1975, by the assignee, *Union Carbide Corporation*.

Hereby enters this disclaimer to claims 1–16 of said patent.

[*Official Gazette May 13, 1975.*]